(12) United States Patent
Bordonaro et al.

(10) Patent No.: US 7,792,083 B2
(45) Date of Patent: *Sep. 7, 2010

(54) METHOD AND APPARATUS FOR MEASURING NETWORK DATA PACKET DELAY, JITTER AND LOSS

(75) Inventors: Frank G. Bordonaro, Los Gatos, CA (US); Kui Zhang, Cupertino, CA (US); Satyanarayana Rao Raparla, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 798 days.

This patent is subject to a terminal disclaimer.

(21) Appl. No.: 11/428,734

(22) Filed: Jul. 5, 2006

(65) Prior Publication Data

US 2006/0239204 A1   Oct. 26, 2006

Related U.S. Application Data

(63) Continuation of application No. 11/041,062, filed on Jan. 21, 2005, now Pat. No. 7,092,410, which is a continuation of application No. 09/434,845, filed on Nov. 4, 1999, now Pat. No. 6,868,094, which is a continuation-in-part of application No. 09/346,080, filed on Jul. 1, 1999, now Pat. No. 6,662,223.

(51) Int. Cl.
*H04W 4/00* (2009.01)

(52) U.S. Cl. ....................................... 370/334

(58) Field of Classification Search ............. 370/479, 370/503, 394, 392, 485, 509, 516, 334, 389, 370/395, 231–233, 251–253, 351, 236; 455/13.4, 455/13; 709/201, 223, 231–233; 714/712; 375/356, 222, 355, 371, 326
See application file for complete search history.

(56) References Cited

U.S. PATENT DOCUMENTS

| | | | |
|---|---|---|---|
| 5,101,208 A | 3/1992 | Parker et al. | |
| 5,193,178 A | 3/1993 | Chillarege et al. | |
| 5,450,394 A | 9/1995 | Gruber et al. | |
| 5,471,631 A | 11/1995 | Beardsley et al. | |
| 5,504,878 A | 4/1996 | Coscarella et al. | |
| 5,812,528 A | 9/1998 | VanDervort | |
| 6,259,677 B1 * | 7/2001 | Jain | 370/252 |
| 6,345,288 B1 * | 2/2002 | Reed et al. | 709/201 |
| 6,363,056 B1 | 3/2002 | Beigi et al. | |
| 6,397,359 B1 * | 5/2002 | Chandra et al. | 714/712 |
| 6,430,394 B1 * | 8/2002 | Boyden | 455/13.4 |
| 6,574,244 B1 | 6/2003 | Petrie et al. | |
| 6,574,661 B1 | 6/2003 | Delano et al. | |
| 6,662,223 B1 | 12/2003 | Zhang et al. | |
| 6,868,094 B1 * | 3/2005 | Bordonaro et al. | 370/516 |

* cited by examiner

*Primary Examiner*—Wing F Chan
*Assistant Examiner*—Prenell P Jones
(74) *Attorney, Agent, or Firm*—Stolowitz Ford Cowger LLP

(57) ABSTRACT

A device for measuring network performance in an Internet protocol (IP) network including a counter generating a send sequence number representing a relative send timing indicator for a data packet sent to a respondent network address. The counter generates a receive sequence number representing a relative receive timing indicator for a return data packet received by the device. A comparator compares the send sequence number with the receive sequence number to measure data packet loss.

20 Claims, 5 Drawing Sheets

METHOD AND APPARATUS FOR MEASURING NETWORK DATA PACKET DELAY, JITTER AND LOSS

RELATED APPLICATIONS

This patent application is a continuation of U.S. patent application Ser. No. 11/041,062, filed Jan. 21, 2005, which is a continuation of U.S. patent application Ser. No. 09/434,845, filed Nov. 4, 1999, now U.S. Pat. No. 6,868,094, which is a continuation-in-part of U.S. patent application Ser. No. 09/346,080, filed Jul. 1, 1999, now U.S. Pat. No. 6,662,223 entitled A PROTOCOL TO COORDINATE NETWORK END POINTS TO MEASURE NETWORK LATENCY, the disclosure of which is incorporated herein by reference.

BACKGROUND OF THE INVENTION

This invention relates to Internet protocol (IP) network systems in which voice or other time-sensitive data are sent in packets from a server to a client or vice versa, and more specifically to method and apparatus for measuring data packet delay, jitter and loss in such systems.

Network applications such as virtual private network (VPN), voice over IP (VoIP) or voice over frame relay (VoFR) network may require an IP service provider (ISP) to monitor data packet loss in a network and/or inter-packet jitter (inter-packet in latency in arrival time). Such may be required as a part of a service agreement between an ISP and a user/client. The service provider needs a way to measure data packet jitter and loss and the users/clients need a way to monitor data packet jitter and loss to ensure they are getting the level of service the ISP agreed to provide.

The above-referenced A PROTOCOL TO COORDINATE NETWORK END POINTS TO MEASURE NETWORK LATENCY patent application, which is commonly owned by the assignee Cisco Technology, Inc., describes a network endpoints coordination protocol (NECP) that claims utility in measuring network latency between network endpoints.

SUMMARY OF THE INVENTION

A method of monitoring performance of an Internet protocol (IP) network is described. The method includes generating a timing probe data packet to be sent over the network, the timing probe data packet containing at least a send time of day (STOD) stamp for a sender of the timing probe data packet. The method further includes sending the timing probe data packet over the network from the sender to a receiver. Finally, the method further includes analyzing the timing probe data packet contents including at least the STOD stamp as a performance measure of the network. Between the sending and the analyzing, the method includes writing, by the receiver, into the timing probe data packet, data including at least a receive time of day (RTOD) stamp, and echoing the timing probe data packet by the receiver thereof. Thus, the sender of the timing probe data packet performs the analysis based upon the STOD stamp and the RTOD stamp.

Preferably, the generating is performed in such manner that the timing probe data packet further contains a send sequence stamp, wherein the writing further includes a receive sequence stamp, and wherein the analysis is based further upon the send sequence stamp and the receive sequence stamp. The analysis may include first calculating the difference between the STOD stamp and the RTOD stamp as a latency performance measure of the network. Most preferably, the generating, sending and analyzing are repeated for at least two successive ones of such timing probe data packets.

The analysis then includes three further calculations. First, the difference between the STOD stamp and the RTOD stamp for a first one of the successive ones of such timing probe data packets is calculated. Second, the difference between the STOD stamp and the RTOD stamp for a second one of the successive ones of such timing probe data packets is calculated. Finally, the difference between the first and second calculated differences is calculated as an inter-packet jitter performance measure of the network.

The foregoing and other objects, features and advantages of the invention will become more readily apparent from the following detailed description of a preferred embodiment which proceeds with reference to the drawings.

DETAILED DESCRIPTION OF THE PREFERRED EMBODIMENT

In a network such as a VoIP or VoFR network, voice is digitized and packetized for transmission over the network in accordance with what will be referred to herein as a datagram-based protocol. Under such protocols, there is a potential for having timing-sensitive digitized voice data packets routed variously between the source and the destination. Packetization and differential routing of data packets in a accordance with a datagram-based protocol is beneficial in terms of optimizing use of bandwidth, but creates a risk that voice data packets may arrive at the destination out of sequence due to different routing path delays or latencies. Such out-of-sequence arrival of voice and other time-sensitive data packets represents a risk of data loss.

Figure 1:
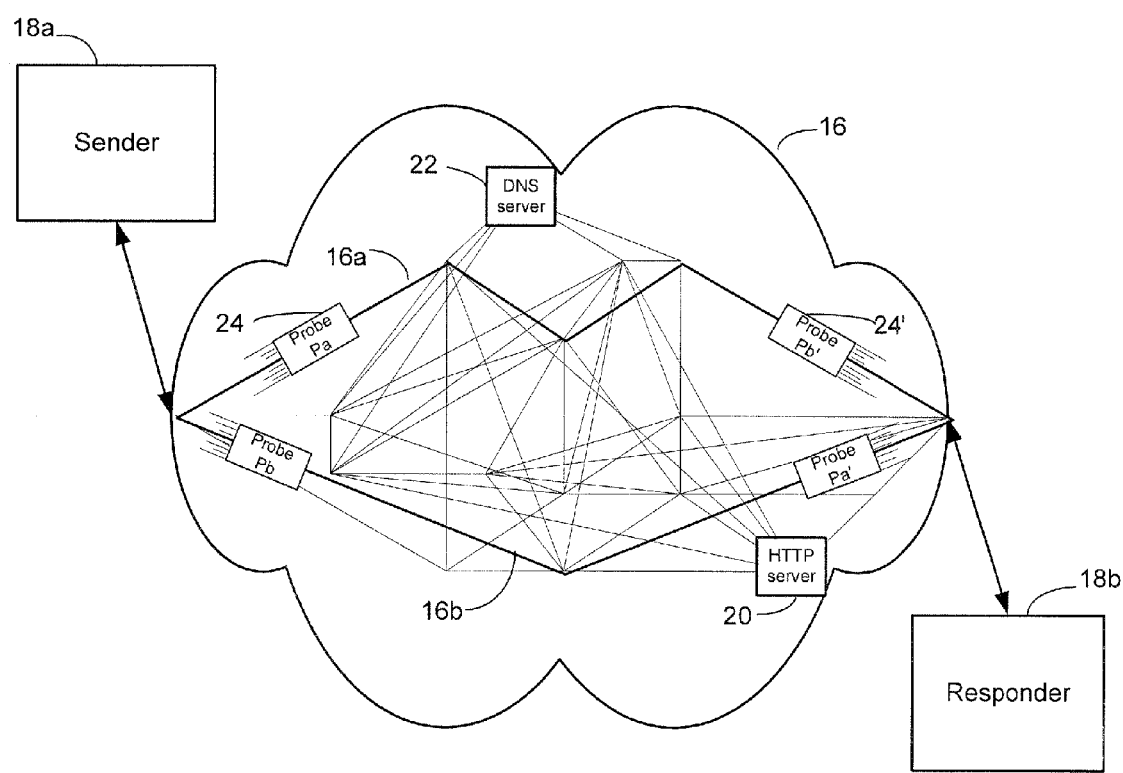
FIGS. 1, 1A and 1B represent a system block diagram of an Internet protocol (IP) network featuring the data packet jitter and loss measurement apparatus according to the invention at slightly different moments of time.
Figure 1A:
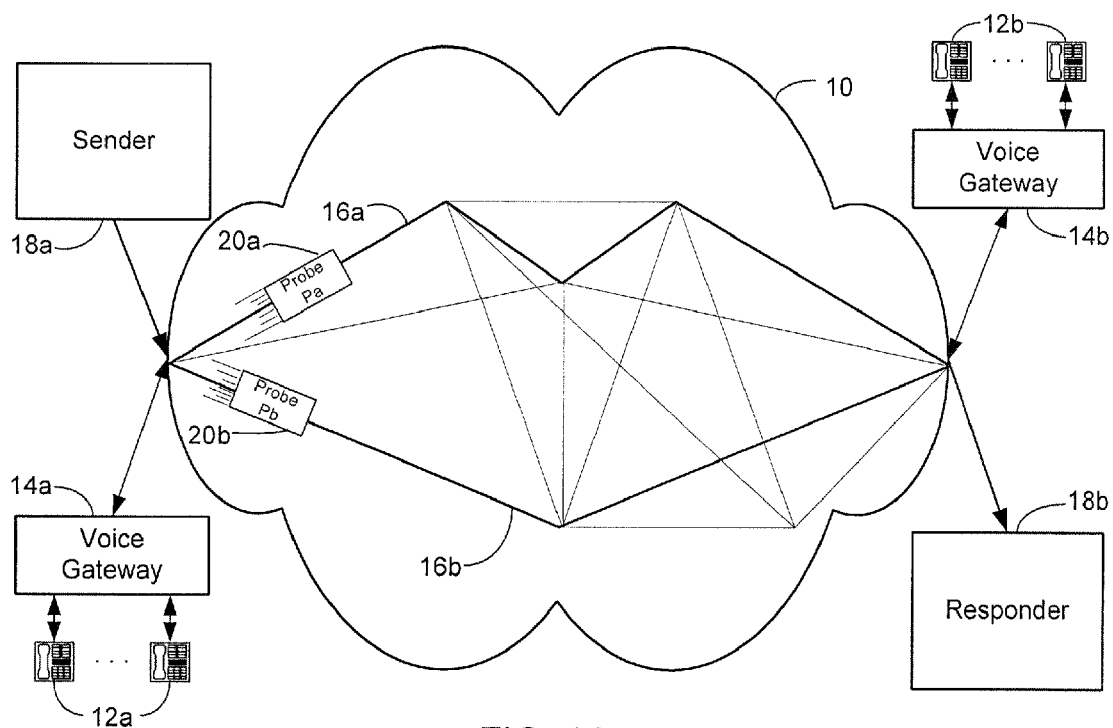
Figure 1B:
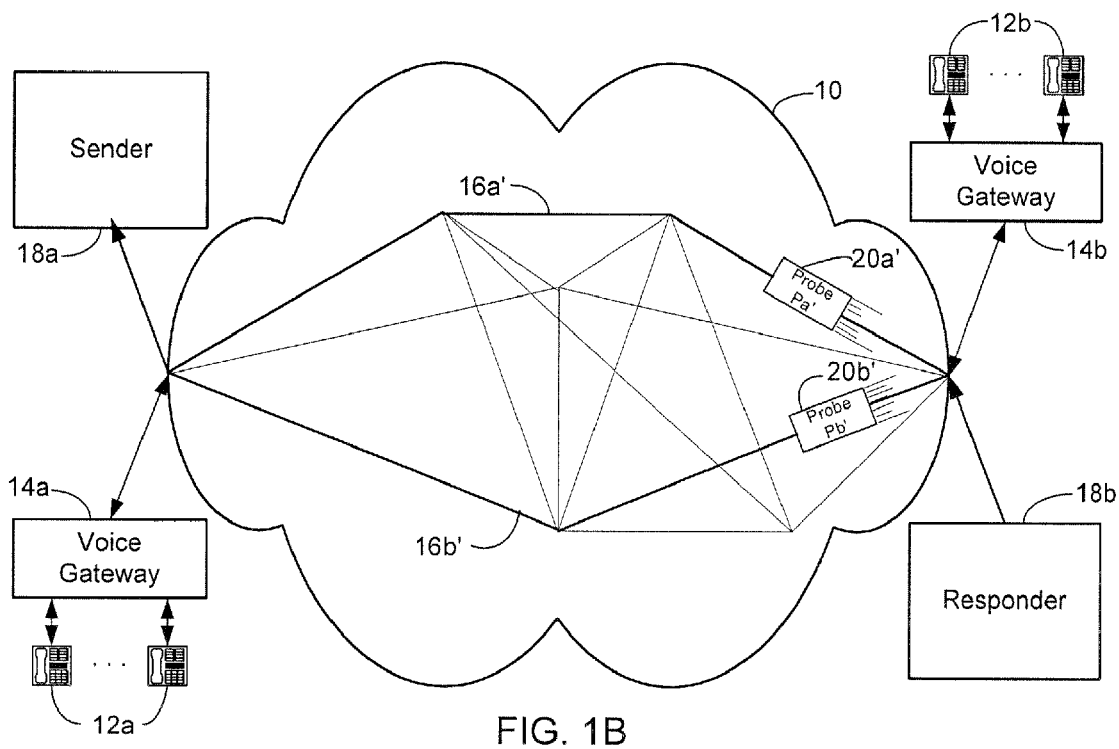

FIGS. 1A and 1B illustrate a network 10 including a multiple voice sources, e.g. telephones, 12a and multiple voice destinations, e.g. telephones, 12b connected within the network. Either of telephones 12a or 12b is capable of being a source or destination of voice in a two-way conversation. A normal conversation is half-duplex, with one or the other of telephones 12a, 12b being a voice source and with the complementary one of telephones 12a, 12b being a voice destination. Network 10 typically includes thousands or tens of thousands of lines with telephones such as telephones 12a, 12b connected in such a conversation. Telephones 12a, 12b typically are connected to network 10 via so-called voice gateways 14a, 14b, which perform the digitization, packetization and optional compression of voice signals that renders them network-compatible.

Those of skill in the art know that network 10 typically includes hundreds of such gateways 14a, 14b, with each gateway typically serving hundreds or thousands of such telephones 12a, 12b. Network 10 also typically includes a web of plural routes or paths 16 therethrough that represent alternative channels through which voice or other time-sensitive data packets such as multimedia information having an audio component may be routed, as in the burgeoning VPN, VoIP or VoFR networks.

The routes through network 10 will be understood to impose different latencies, or delays, upon the transmission timing of data packets traveling therethrough. Because different but related data packets, e.g. successive data packets from the same source, may be differently routed through the network, they typically may arrive at the intended destination at different times. Such latency will be understood to be caused largely by the amount of time data packets may reside temporarily in network nodes along the way as part of the normal routing from their source and destination within network 10.

Those of skill in the art will appreciate that routing within the network is performed by routing software that keeps track of traffic on various data channels. The routing software then assigns bandwidth within such channels. In this manner, the software determines the routing of various data packets through the network to maximize use of network bandwidth while serving as many customers, e.g. telephone callers, Internet users/client and service providers, as possible. It is this desirable flexibility in routing that results inevitably in latencies through the network of variously routed data packets.

Because the latencies among various data packets are not constant, successive data packets from the same source can arrive at the destination out of sequence. Out-of-sequence arrivals of data packets may be treated at the destination as representing data loss, i.e. the later arrival of an earlier data packet may be deemed loss of that late-arriving data packet. By sending a sequence number within at least two successive dedicated probe data packets, the destination of the probe data packets can detect out-of-sequence arrivals and thus can monitor the performance of the network by measuring data packet loss.

By time stamping a dedicated probe data packet at the source, latency through the network may be measured at the destination. By time stamping a probe data packet at the source and also at the destination, and then by echoing the probe data packet back to the source, two-way latency through the network may be measured at the source. By time stamping successive probe data packets, variance in network latencies as between the successive probe data packets may be measured. Such variance will be referred to herein as data packet jitter.

Three classes of performance metrics are possible. One-way metrics include measures of absolute latency for a data packet through the network, and require only time stamping at the source and time receipting at the destination. One-way metrics also may include measures of relative latency as among two or more data packets, with the same modest requirement. Two-way metrics include measures of absolute latency for a data packet through the network, and require time stamping at the source, time stamping at the destination, echoing at the destination and a simple calculation at the source. Two-way metrics also may include measures of relative latency as among two or more data packets, with the same modest requirement. Thus, data packet jitter may be understood to be detectable without echo, while data packet loss may be understood to require echo for detection.

In either case, the overhead required to measure network performance is minimal. This is true even with the so-called 'active sampling' technique that characterizes the invention, whereby dedicated test probe data packets are sent and received over the network.

There are many protocols and services under which voice data or other timing-sensitive data may be conveyed within a network architecture. The most common protocol is the user datagram protocol (UDP), which will be used herein for illustration of the preferred embodiment of the invention. UDP is believed to be most illustrative of the invention because it is the most prevalent protocol providing for the real-time conveyance in a network of multimedia, voice and other time-sensitive data subject to data loss and jitter. Those of skill in the art will appreciate that use of other protocols and services in conjunction with the methods and apparatus described herein are contemplated as being within the scope and spirit of the invention.

Referring still to FIG. 1A, the invention preferably takes the form of a service assurance agent (SAA) 18, which may be seen to include components SAA sender 18a and SAA responder 18b. SAA 18 may be understood to be any agent coupled to or within a network 10 which performs the invented data latency and inter-packet jitter performance metrics. It will be appreciated that SAA 18 may be integrated into the resident network operating system (OS) or may reside in a dedicated or shared server node of network 10 such as voice gateways 14a, 14b. SAA 18 may be invoked upon command by the network OS or on demand by quality assurance persons or customers. Preferably, it is invoked by the network OS periodically as a pro-active management and reporting tool.

SAA sender 18a instructs SAA responder 18b to comply with the network metrics protocols described in connection with the NEPC application referenced above and the per-direction and round-trip data packet delay, inter-packet jitter and loss protocol described and illustrated herein. SAA sender 18a is so called because it is the initiator of network performance measurements in accordance with the invention. It will also be understood that voice gateways 14a, 14b and other servers involved in the invented network metrics may themselves contain dedicated SAA responder 18b software that responds to delay, jitter and loss probes sent by SAA sender 18a software.

FIGS. 1A and 1B illustrate how jitter probe packets Pa and Pb may be sent out over network 10 and may be routed differently therethrough between sender 18a and responder 18b. For example, jitter probes 20a and 20b (representing probe data packets Pa and Pb, respectively) are routed respectively along paths 16a and 16b through network 10, as shown in FIG. 1A, from sender 18a to responder 18b. Jitter probes 20a' and 20b' (representing echo data packets Pa' and Pb', respectively) are routed respectively along different return paths 16a' and 16b' through network 10, as shown in FIG. 1B, from responder 18b to sender 18a. In FIG. 1B, responder 18b has responded to sender 18a's probe by echoing nearly identical probes as were received by responder 18b back to sender 18a, as will be further explained by reference to FIGS. 3 and 4. Thus FIG. 1B may be seen to represent a moment of time slightly later, e.g. a fraction of a second, than that represented by FIG. 1A.

Those of skill in the art will appreciate that a so-called 'jitter' probe is defined in accordance with the invention. The UDP jitter probe generally designated 20 in FIGS. 1A and 1B will be described in detail herein. Other probes may, within the spirit and scope of the invention, be similarly defined to achieve at least one-way or round-trip data packet latency metrics as well as inter-packet jitter and loss metrics. It will be appreciated that in some cases, the accuracy of the metrics is affected by the load on the central processor units (CPUs) of the source router and destination web server.

SAA 18 preferably resides on a server node and executes as software, firmware or hardware, all within the spirit and scope of the invention. Preferably, SAA 18 performs active performance assessment and assurance of the network to which it is connected, thereby to ensure customer satisfaction. In a way, SAA 18 acts as a router dedicated not to normal network routing of client requests to ISPs or of voice or other time-sensitive data between telephone conversants, but dedicated instead to network performance assurance. Of course, those of skill in the art will appreciate that SAA 18 uses existing network channels and the above-described NECP to measure a) network data packet latency per direction, b) round-trip network data packet latency, c) inter-packet network jitter and d) data packet loss per direction. Those of skill also will appreciate that alternative protocols, within the spirit and scope of the invention, may be used.

It may also be appreciated that there may be within network 10 what will be referred to herein as data jitter. Data jitter refers to inter-packet delay variance, i.e. variations in transit time between a source and a destination. This is because routers within network 10 typically route packetized data in accordance with traffic demand and channel capacity in an attempt to maximize bandwidth and to minimize response time. As a result, related data packets and even successive data packets may be routed differently through network 10. This is illustrated in FIG. 1A by a web of routes 16 within network 10, two typical outgoing paths (from sender to responder) 16a, 16b being highlighted by bold lines making intermediate stops at different switching nodes along the way. Paths 16a, 16b thus represent differential route timing within network 10, since they pass through different numbers of switches each typically imposing delay. It is further illustrated in FIG. 1B by a web of routes 16 within network 10, two typical incoming or return paths (from responder to sender) 16a', 16b' also being highlighted by bold lines representing differential echo data packet timing.

Also illustrated in FIGS. 1A and 1B is the fact that data packets that are related in some way—e.g. data probes Pa and Pa' or data probes Pb and Pb' related generally as query and echo data—nevertheless may be routed differently within network 10. Thus, a number of timing variables are introduced by the otherwise-beneficial discretionary routing of data within network 10.

As between successive data packets, a first data packet may transit network 10 from source to destination (sender 18a to responder 18b) in a first amount of elapsed time (represented in FIG. 1A by boldface highlighted route 16a). Such routing timing typically is measured in milliseconds. A second data packet in the succession of data packets may transit from source to destination in a second amount of elapsed time that is greater or smaller than the first, but still typically measured in milliseconds. Such is illustrated in FIG. 1A by boldface highlighted route 16b having fewer interposed node switches than route 16a and thus representing a smaller elapsed time. If the route timing of the second packet in succession is slightly larger, then there is no out-of-sequence receipt of the second packet but there may be out-of-sequence receipt of a third packet that arrives ahead of the delayed second packet. Some delay of course is expected and may well represent acceptable network performance. From the example immediately above, delay variance may result in data packet loss because the sequential arrival at the destination as among successive packets is different from the sequence in which they left the source.

If the route timing of the second packet in succession is smaller (as illustrated in FIG. 1A, where path 16b has fewer interposed switch nodes than path 16a,) then there risk of data loss since the later-sent packet arrives at the destination before the earlier-sent packet. Again, loss results from out-of-sequence arrival of packets at the destination. Data loss, as opposed to data delay, typically is defined by protocol. For example, respondent routing software at the voice destination 'times out' successive data packets that are separated by more than a given duration, e.g. two seconds, and treats the variance in transit time as a data loss.

Figure 2:
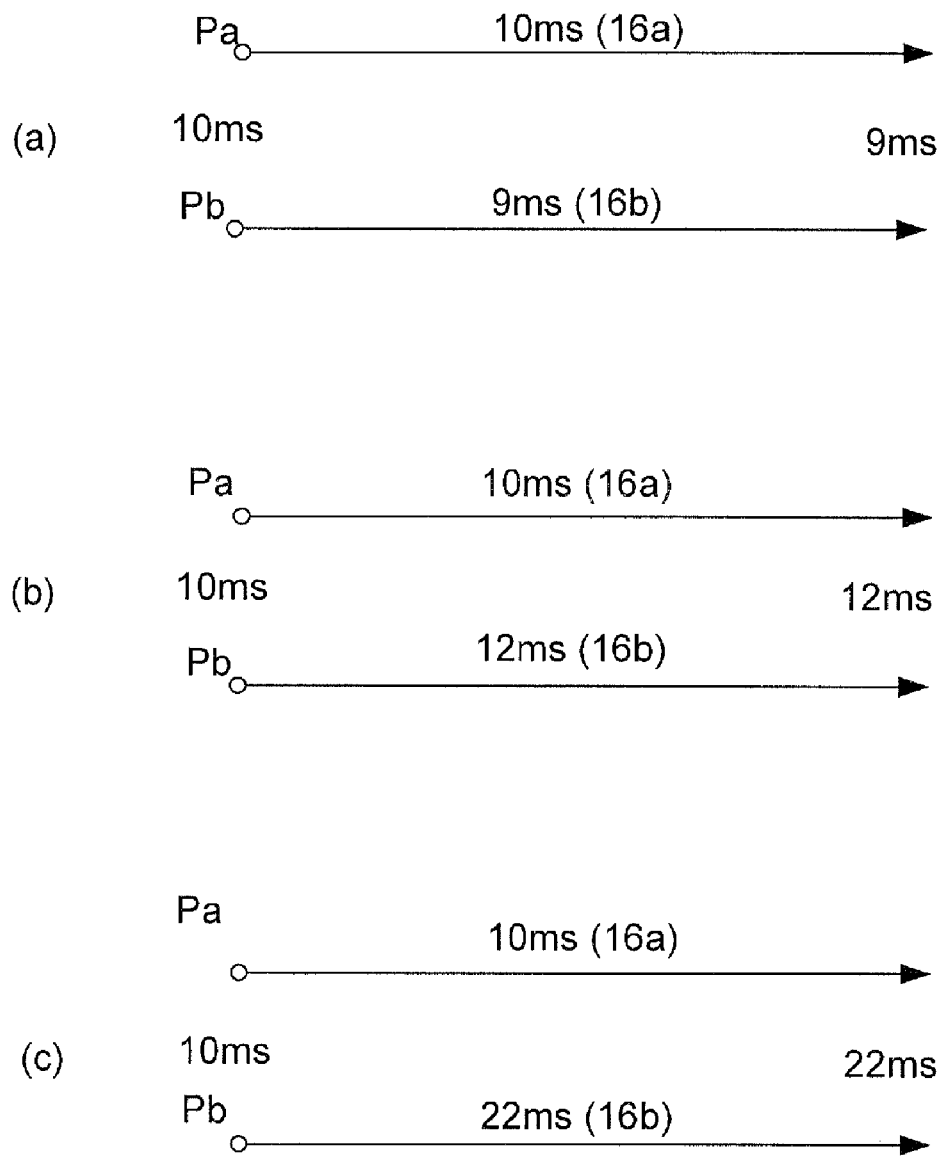
FIG. 2 is a schematic diagram illustrating three different hypothetical packet-timing scenarios.

Referring briefly to FIG. 2, three different packet-timing scenarios, or cases, will be described. Suppose two probe data packets Pa, Pb are sent 10 ms apart, as indicated to the left of three horizontal line pairs labeled (a), (b), (c) indicating the three different cases. The two packets Pa, Pb experience different transit times in reaching the destination, as indicated above each line. The different transit times cause the two packets Pa, Pb to arrive at the destination with different delay variances, as indicated to the right of the three horizontal line pairs. In case (a), the packets arrive in sequence. Network 10 response is good. The delay variance is 9 ms−10 ms=−1 ms, implying that variance is good. In case (b), the 12 ms−10 ms=+2 ms delay variance implies some congestion or delay in network 10. Still, packets Pa, Pb arrive in sequence. In case (c), the 22 ms−10 ms=+12 ms delay variance is large and may cause packets to arrive out of sequence. (For example, if a third packet Pc were sent 10 ms after Pb and arrived at the destination 10 ms later, then the destination might receive third packet Pc before it receives second packet Pb.)

Because the transit, or route, timing varies among routes and even over the same route with time, there is some variance in data packet arrival at the destination, or responder, address. Such variance in arrival time, which as illustrated above by reference to FIG. 2 may or may not represent data loss, is called data packet jitter.

The same transit timing variance as between successive data packets through network 10 applies also to return paths 16a' and 16b', wherein it may be seen from FIG. 1B that path 16a' has more interposed switch nodes than path 16b'. This differential packet routing similarly will be understood to represent differential transit time for the two echo probe packets returned by responder 18b to sender 18a, subject to the same latency, jitter and loss metrics. Thus, the invention may be seen to be equally applicable to measuring network data packet delay, jitter and loss in either direction.

In accordance with the invention, data jitter and loss are monitored in network 10 as a performance measure of the network. Data jitter and loss are monitored in accordance with the invention by what will be referred to herein as active-sampling method and apparatus. Under this invented monitoring protocol, one or more test, or so-called probe, data packets containing packet timing and sequence information are transmitted to a remote network address and a response of the network to such transmission is analyzed and recorded. Such measurement of the network's performance may be used for internal benchmarking or external reporting, e.g. to network customers such as telephone service providers, to improve service or to document compliance with performance criteria.

SAA 18 preferably takes the form of software executing on one or more server nodes within network 10. SAA 18 will be understood to have two components, in accordance with the invention. An SAA sender 18a sends a dedicated network probe packet for the purpose of network performance assurance. An SAA receiver, or responder, 18b receives the dedicated network probe packet sent by SAA sender 18a and responds in a predetermined manner. It will be seen that SAA responder 18b may perform one-way metrics, e.g. measuring one-way latency or jitter. It will also be seen that SAA responder 18b may simply echo the probe data packet back to SAA sender 18a whereby sender 18a may perform two-way, or round-trip, metrics.

Figure 3:
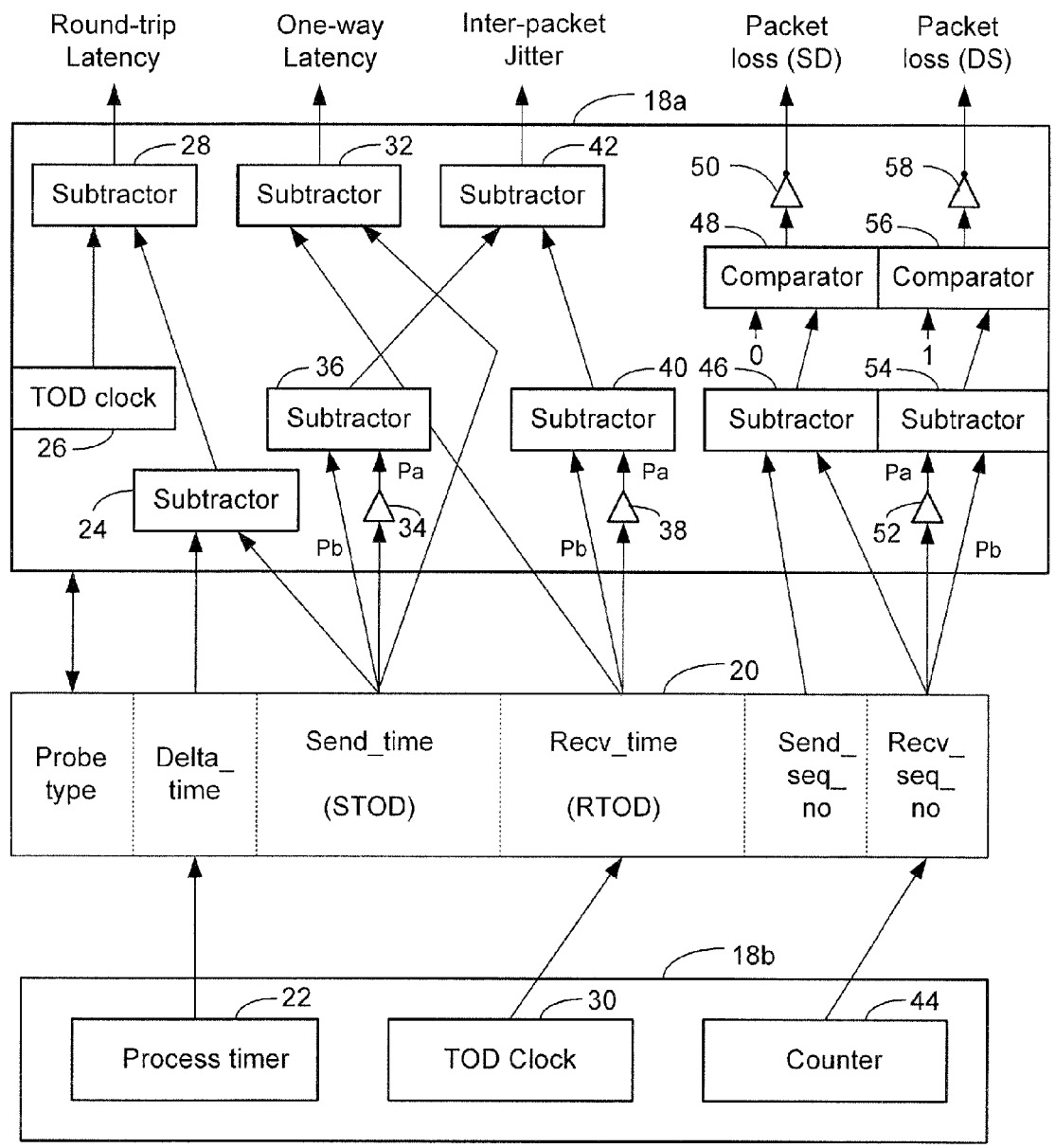
FIG. 3 is a detailed block diagram of the measurement apparatus in accordance with the invention.

Referring now to FIG. 3, an UDP jitter probe 20 is defined for use by SAA 18 in various performance measurements in network 10. Jitter probe 20 allows the user to accurately measure jitter, packet loss and the round trip delay. This allows customers to base service level agreements on the results. The amount of time a probe packet spends in the source and destination SAA routers is not counted in the measurements. Accordingly, the measurement and reporting based thereon accurately reflect the performance of the network.

To achieve the required accuracy and to provide the desired packet-loss and inter-packet jitter metrics, the following fields are included in the structure of UDP jitter probe 20.

1. Probe Type (2 bytes)

Tells responder 18b what kind of probe this is. This may simply be a numeric code representing the probe type, to distinguish among various types of probes constructed in accordance with the invention that may be concurrently in transit within a given network 10. Responder 18b reads the probe type field first, and interprets the remaining fields in accordance with an established protocol for the given probe type.

2. Responder Processing Time delta_time (2 bytes)

Responder 18b places in this field the amount of time in milliseconds spent in the responder. This number will be subtracted from the difference between the send time and receive time for the same packet. Thus, the internal processing time of the software within responder 18b will not figure into a measure of network latency.

3. Sender Timestamp Px send_time (sender) (4 bytes)

Sender 18a places a time stamp in this field whenever it sends the packet. Also referred to herein as send time of day (STOD).

4. Receiver Timestamp Px recv_time (responder) (4 bytes)

Responder 18b places a timestamp in this field upon receipt of the packet. Also referred to herein as receive time of day (RTOD).

5. Send Sequence Number Px send_seq_no (2 bytes)

This field is set by sender 18a and represents the number of packets the sender has sent out thus far during this instance of jitter probe 20.

6. Receive Sequence Number Px recv_seq_no (2 bytes)

This field is set by responder 18b and represents the number of packets the responder has received during this instance of jitter probe 20.

Accordingly, it will be appreciated that at least sixteen bytes are needed in the UDP payload to carry the above fields. This is possible in conformity with typical data packet payloads traversing existing networks 10. For example, a VoIP packet typically contains about thirty-two bytes in the UDP payload.

Referring still to FIG. 3, SAA sender 18a and responder 18b are illustrated respectively above and below probe 20. Sender 18a is capable of writing and reading the Probe type field, the use of this particular field forming no part of the present invention. Sender 18a reads the Delta_time field which contains the elapsed process time, or processor overhead, of responder 18b in echoing the probe data packet 20. This Delta_time field is written into probe data packet 20 by responder 18b via Process timer 22 before the probe packet is echoed back to sender 18a. Sender 18a also is capable of writing and reading the Send_time field (STOD), although only the reading thereof is illustrated for the sake of simplicity.

Sender 18a calculates a first difference between the Send_time field (STOD) and the Delta_time field in any suitable manner. This first difference calculation is illustrated in FIG. 3 as a subtractor 24, although those of skill in the art will appreciate that any suitable means of determining the first difference is contemplated. Sender 18a further calculates a second difference between the first difference (representing the adjusted receipt time of the probe packet) and the present time of day (TOD) via a TOD clock 26. This second difference calculation is illustrated in FIG. 3 as a subtractor 28, though again those of skill in the art will appreciate than any suitable means for determining the second difference is contemplated. Those of skill in the art will appreciate that this second difference represents the unburdened (i.e. adjusted so as not to include responder processing overhead) two-way or round-trip latency, or delay, of probe data packet 20 as it is routed through network 10 from SAA sender 18a to SAA responder 18b and back to SAA sender 18a. Thus, a first useful network performance measure is realized in accordance with the invention.

Sender 18a also reads the Recv_time field (RTOD) which contains the time of day probe packet 20 was received. This Recv_time field (RTOD) is written into probe data packet 20 from a TOD clock 30 in responder 18b upon receipt of the probe data packet by the responder. Sender 18a calculates a third difference between the Send_time field (STOD) and the Recv_time field (RTOD). This third difference calculation is illustrated in FIG. 3 as a third subtractor 32, although those of skill in the art will appreciate that any suitable means for determining the difference is contemplated. Those of skill in the art will appreciate that this third difference represents the one-way latency of probe data packet 20 as it is routed through network 10 from SAA sender 18a to SAA responder 18b. Thus, a second useful network performance measure is realized in accordance with the invention.

Sender 18a buffers the Send_time field (STOD) in a buffer 34 to calculate a fourth difference between the Send_time fields (STODs) of successive probe data packets Pa and Pb. This fourth difference calculation is illustrated in FIG. 3 as a fourth subtractor 36, although those of skill in the art will appreciate that any suitable means for determining the difference is contemplated. Those of skill also will appreciate that this fourth difference represents the send data skew between successive packets over network 10 as seen by SAA sender 18a.

Sender 18a also buffers the Recv_time field (RTOD) in a second buffer 38 to calculate a fifth difference between the Recv_time fields (RTODs) of corresponding successive probe data packets Pa and Pb. This fifth difference calculation is illustrated in FIG. 3 as a fifth subtractor 40, although those of skill in the art will appreciate that any suitable means for determining the difference is contemplated. Those of skill also will appreciate that this fifth difference represents the receive data skew between the corresponding packets over network 10 as seen by SAA responder 18b.

Sender 18a then calculates a sixth difference between the send data skew and the receive data skew, a difference that represents inter-packet jitter. This sixth difference calculation is illustrated in FIG. 3 as a sixth subtractor 42, although those of skill in the art will appreciate that any suitable means for determining the skew difference, or inter-packet jitter, between sender 18a and responder 18b is contemplated. Thus, a third useful network performance measure is realized in accordance with the invention.

Sender 18a also is capable of writing and reading the Send_seq_no field, although only the reading thereof is illustrated for the sake of simplicity. In accordance with one embodiment of the invention, sender 18*a* reads the send sequence number that sender 18*a* wrote into the Send_seq-no field when the probe data packet was sent. Sender 18*a* also reads the read sequence number that responder 18*b* wrote into the Recv_seq_no field. Responder 18*b* writes this Recv_seq_no from a counter 44 that is incremented each time a probe data packet is received. It will be appreciated that the Send_seq_no field contains a sequence number representing the last probe data packet sent by sender 18*a*, while the Recv_seq_no field contains a sequence number representing the last probe data packet received by responder 18*b*.

Sender 18*a* calculates the difference between the two sequence number fields. This seventh difference calculation is illustrated in FIG. 3 as a subtractor 46, although those of skill in the art will appreciate that any suitable means for determining the difference between the two sequence number fields is contemplated. Sender 18*a* then compares this seventh difference to 0, as illustrated by a first comparator 48 in FIG. 3. Those of skill will appreciate that there has been data packet loss (SD) on the way to responder 18*b* if the difference between the send and receive sequence numbers is not 0. Accordingly, this determination that there has been loss of data is illustrated in FIG. 3 as a first inverter 50 of the result of such comparison. Thus, a fourth useful network performance measure is realized in accordance with the invention.

Packet loss in the reverse direction (loss on the way back from responder 18*b*) also may be measured in accordance with the invention. Those of skill in the art will appreciate that a third buffer 52, an eighth subtractor 54, a second comparator 56 and a second inverter 58 may be configured as shown in FIG. 3. This configuration of elements provides a measure of such packet loss (DS) whereby the difference between a buffered, or delayed, version of Pa recv_seq_no and Pb recv_seq_no is compared with 1 and if the comparison is not true, there has been packet loss.

The invention may be described as a sender and responder software programs, e.g. SAA 18, for measuring data packet transmission timing characteristics through an Internet protocol (IP) network such as network 10. The programs include a sender software program such as SAA responder 18*a* residing on a computer-readable medium at a network node, e.g. voice gateway 14*a*. The sender software program generates a probe data packet 20 to be sent over network 10. Preferably, the probe data packet contains at least a send time of day (STOD) stamp. In this case, the send time of day stamp is represented by Send_time field (STOD). The sender software program transmits the probe data packet to a respondent address in the network.

The programs also include a responder software program, e.g. SAA responder 18*b*, also residing on a computer-readable medium at a network node, e.g. voice gateway 14*b*. The responder software program receives probe data packet 20 and places therein at least a receive time of day (RTOD) stamp, i.e. the recv_time field (RTOD) of packet 20. The responder software program echoes the packet by transmitting the modified packet back to SAA sender 18*a*.

The sender software program then determines a first difference between the RTOD and the STOD, whereby the first calculated difference represents data packet transmission timing through the network. Probe data packet 20 when generated by the sender software program preferably further includes a send sequence number, e.g. Send_seq_no, for the present probe packet representing the sequence in which plural ones of such probe data packets are sent. Upon receipt of such a probe data packet containing a send sequence number, the responder software program further places in the received probe data packet a receive sequence number representing the last received probe data packet in sequence. The echoed probe data packet thus contains a send sequence number and a receive sequence number that should be in synchronization with one another, i.e. Send_seq_no and Recv_seq_no should be the same. Sender software program then further compares the send sequence number and the receive sequence number and records any such greater difference therebetween as a data loss, preferably in accordance with equations (4) and (5) above.

It will be appreciated that the responder software program may reside at any node in the network, most preferably at the respondent network address. It will also be appreciated that the responder software program may resides at the same network address as does the sender software program. In other words, a sole dedicated server such as single voice gateway 14*a* may be the residence of both the sender and responder software program. In this way, one-way latency, round-trip latency, inter-packet jitter and packet loss all may be measured for network 10 by independently operating sender and responder programs within gateway 14*a*.

The method in accordance with the invention now may be understood. One-way latency may be calculated by sender 18*a* or by responder 18*b* in accordance with the following equation:

$$\text{One-way latency} = Pa\ \text{recv\_time (responder)} - Pa\ \text{send\_time (sender)}, \quad (1)$$

where Pa recv_time is the receive time of day (RTOD) of receipt of packet Pa at the responder node and where Pa send_time is the send time of day (STOD) of the same packet Pa.

Round-trip latency may be calculated by sender 18*a* in accordance with the following equation:

$$\text{Round-trip latency} = Pa\ \text{recv\_time (sender)} - Pa\ \text{send\_time (sender)} - Pa\ \text{delta\_time (responder)}, \quad (2)$$

where Pa recv_time (sender) is the receive time of day (RTOD) of jitter probe packet Pa at the sender node.

The following lettered steps illustrate typical operation of jitter probe 20 in accordance with the invention.

a. Sender 18*a* places a sequence number (starting from 1) in the send_seq_no field of the packet. Sender 18*a* also places a timestamp in the send timestamp field. Sender transmits the jitter probe packet to responder 18*b*. Sender 18*a* does this for every interval. Every time, the send_seq_no is incremented.

b. Responder 18*b* receives the jitter probe packet and increments its receive counter. Responder 18*b* places a receive timestamp in the recv_time field of the packet; places the receive counter in the recv_seq_no field of the packet; calculates the amount of time the packet spent in the responder; and places this delta time in the delta_time (responder) field. Responder 18*b* transmits jitter probe packet back to sender 18*a*.

c. SAA sender 18*a* receives the reply and stores jitter probe packet in memory.

d. When SAA sender 18*a* receives the next reply, it compares the current reply with the last reply it received.

e. A jitter calculation is performed, in accordance with the invention, as follows. Suppose two consecutive jitter probe packets are labeled Pa and Pb. The jitter value from source to destination is given by the following equation:

$$\text{Jitter} = (Pb\ \text{recv\_time} - Pa\ \text{recv\_time}) - (Pb\ \text{send\_time} - Pa\ \text{send\_time}). \quad (3)$$

SAA 18 calculates jitter for all consecutive replies it receives, i.e. so long as Pb send_seq_no−Pa send_seq_no=1. Jitter results preferably are aggregated into sums, and sums of squares, to facilitate calculation of averages and standard deviations. Minimum (MIN) and maximum (MAX) values also are saved. Furthermore, positive and negative jitter values are saved separately, since they reflect different network conditions. A positive jitter value represents increasing inter-packet arrival time at the destination, while a negative jitter value represents decreasing inter-packet arrival time. Based upon the receive timestamp and responder processing time fields in the packets, it is possible also to determine when the packet is sent out from the responder. Thus the jitter values from destination to source may be calculated. Similarly, jitter from source to destination may be calculated.

Figure 4:
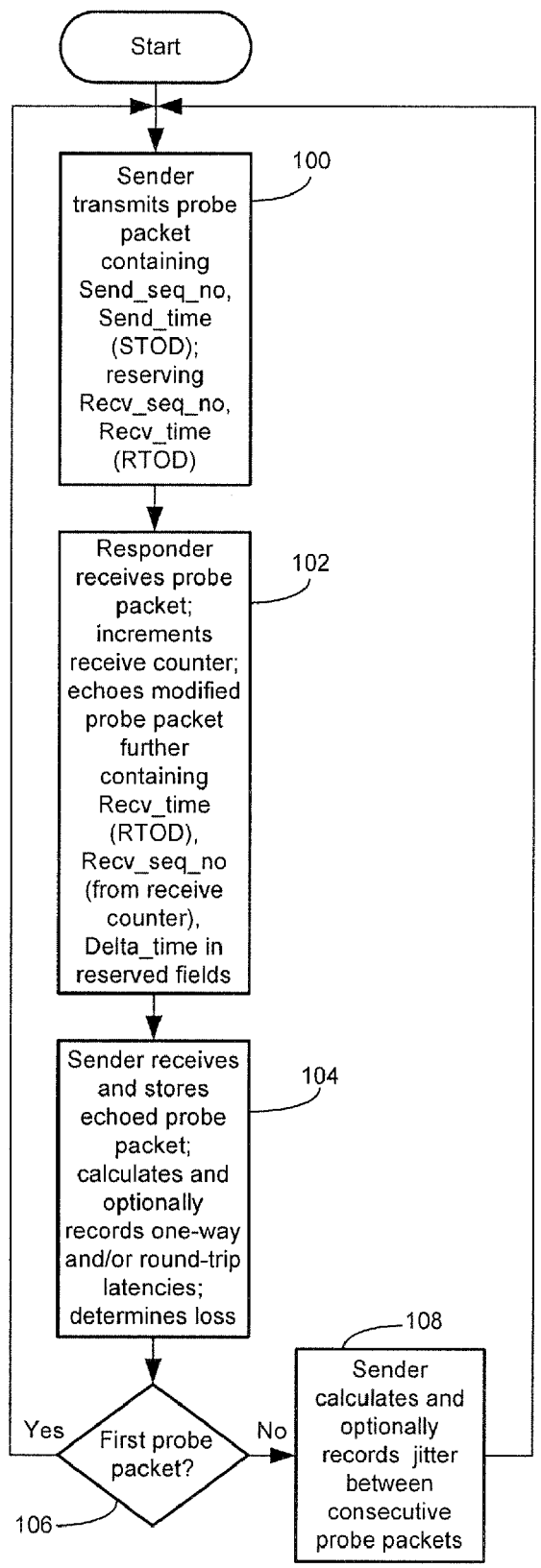
FIG. 4 is a flow chart illustrating the performance measurement method in accordance with the invention.

These steps a through e for measuring latency, jitter and loss within a network are further illustrated in FIG. 4 in the form of a flow chart. FIG. 4 shows the UDP jitter probe method in accordance with the invention. The method starts at 100, where sender 18a performs step a, above, by generating and transmitting a first performance probe data packet 20. At 102, responder 18b performs step b, above, by modifying and echoing performance probe data packet 20 back to sender 18a. At 104, sender performs step c, above, storing jitter probe packet in a memory and optionally recording, e.g. in a memory, the metrics that preferably include the latency and loss measurement calculations and determinations. It will be appreciated by those of skill in the art that such a first performance probe data packet Pa is illustrated in FIG. 1A.

At 106, sender 18a may send another performance probe data packet Pb by returning to block 100. It may be determined at 106 that two or more performance probe data packets Pa, Pb already have been transmitted and their echo probe data packets Pa', Pb' received as illustrated in FIG. 1B. In this case, at 108 sender 18a performs steps d and e, above, by calculating and optionally recording, e.g. in a memory, a jitter value as between consecutive performance probe data packets Pa, Pb. Those of skill in the art will appreciate that jitter may be calculated in any suitable manner representative of probe packet arrival variance and optionally recorded and reported in any suitable actual or derived units, within the spirit and scope of the invention.

The outgoing, or forward, SAA packet-loss calculation is in accordance with the following equation:

$$\text{Loss }(SD) = Pb \text{ send\_seq\_no} - Pb \text{ recv\_seq\_no}, \quad (4)$$

where Loss (SD) is packet loss on the way to responder 18b (from source to destination).

The incoming, or reverse, SAA packet-loss calculation is in accordance with the following equation:

$$\text{Loss }(DS) = Pb \text{ recv\_seq\_no} - Pa \text{ recv\_seq\_no} - 1, \quad (5)$$

where Loss (DS) is packet loss on the way back from responder 18b (from destination to source).

Assume that a packet is missing in action (MIA). MIA is defined as a case in which sender 18a receives no replies for the last predetermined number of one or more packets it sent. For example, assume that sender 18a sends out 10 packets, but receives no replies for packets 9 and 10. Then these two packets will be counted as MIA, since there is no way to determine whether they were lost on the way to responder 18b or on the way back from responder 18b. It may be seen that total packet loss is defined by the following equation:

$$\text{Total packet loss} = \text{Loss }(SD) + \text{Loss }(DS) + MIA. \quad (6)$$

The following discussion is exemplary of packet loss over a network. Suppose:

a. SAA sender 18a transmits a packet with sequence number 1 (packet #1) to responder 18b.

b. Responder 18b receives the packet and increments its recv counter to 1. Responder 18b then places the recv_seq_no (1) into the reply packet.

c. Sender 18a receives the packet, with send_seq_no=1; recv_seq_no=1. In a perfect world, send_seq_no=recv_seq_no.

d. Sender 18a transmits packet #2, but this packet is 'lost' in the forward direction, i.e. on the way to responder 18b. By 'lost', we mean responder 18b never receives it.

e. Sender 18a transmits packet #3 and responder 18b receives it. Responder 18b increments its recv counter to 2. Now, in the reply packet, send_seq_no=3, recv_seq_no=2.

f. Sender 18a receives the reply with send_seq_no=3, recv_seq_no=2. Sender 18a knows there was 3−2=1 packet lost on the way out. Sender 18a also compares this packet with the previous reply it received in step c. Since send_seq_no=1 and recv_seq_no=1, it is concluded that there is no gap in the two recv_seq_no's. This means there is no packet loss in the reverse direction, i.e. on the way back from responder 18b.

g. Sender 18a transmits packet #4; responder 18b receives it. Responder 18b increments recv counter to 3. But packet #4 is lost on the way back from responder 18b to sender 18a.

h. Sender 18a transmits packet #5 and responder 18b receives it. Responder 18b increments recv counter to 4 then replies to packet #5.

i. Sender 18a receives the reply: send_seq_no=5, recv_seq_no=4. Sender 18a compares the reply to the previous packet it received in step f. The previous recv_seq_no was 2, while the present recv_seq_no is 4. This gap (the difference between successive sequence numbers being greater than one) between the two recv_seq_no's indicates there was a packet lost on the way back.

j. Sender 18a transmits packet #6. No reply is received. Suppose this is the last packet sender 18a will be transmitting. Sender 18a has no way to know whether it was lost on the way or on the way back. So, packet #6 is MIA.

Packet loss may be summarized as follows, in this example, calculations being in accordance with equations (4) and (5) above. Loss(SD)=1; Loss(DS)=1; MIA=1. In accordance with equation (6) above, it may be seen that Total packet loss=3.

The active-sampling method of the invention includes generating one or more performance probe data packets Pa, Pb for transmission over network 10, wherein each performance probe data packet is dedicated to network performance measurement, as described by reference to UDP probe 20. Each probe data packet contains one or more defined timing and sequencing parameters including send time of day Send_time (STOD), receive time of day Recv_time (RTOD), send sequence number send_seq_no and receive sequence number recv_seq_no, as described above by reference to FIG. 3. The method further includes transmitting the one or more performance probe data packets over the network to a respondent address in accordance with a predefined protocol to which software residing at the respondent address is programmed to respond in a predefined way. This is described above by example and by reference to FIG. 3. Finally, the method includes analyzing a response from the software at the respondent address in accordance with the predefined protocol with respect to the one or more defined timing and sequencing parameters to measure the performance of network 10.

In accordance with the invention, the generating, transmitting and analyzing steps are performed by dedicated performance assurance software such as SAA sender 18a residing at a given network node such as voice gateway 14a. Also in accordance with the invention, software such as SAA responder 18b residing at the respondent address modifies one or more of the defined timing and sequencing parameters within each received performance probe data packet in accordance with the predefined protocol. SAA responder 18b then echoes the received-and-modified performance probe data packet back to SAA sender 18a. It will be appreciated that, in accordance with the invention, the software resident at the respondent address is dedicated performance assurance software such as SAA responder 18b, which performs the modifying and echoing of the received-and-modified performance probe data packet.

A timing probe configured in accordance with the invention may contain as little as send timing information such as the Send_time field (STOD), or TOD stamp for SAA sender 18a of the timing probe data packet. In such case, the simplified timing probe is sent over network 10 to a receiver and the timing probe data packet contents are analyzed as a performance measure of the network. In this case, software at a respondent address simply echoes, without modification, the contents of the timing probe data packet and SAA sender 18a calculates a round-trip latency for the network based upon the different times of day of transmission and receipt. SAA responder 18b at the respondent address alternatively may perform a one-way latency calculation based upon the Send_time field (STOD) contents and the TOD of receipt at the respondent address of the probe data packet, as by responder 18b reading its own TOD clock 30. More preferably, in accordance with the invention, responder 18b writes into the timing probe data packet data including at least a receive TOD stamp, e.g. Recv_time field (RTOD), and echoes the timing probe data packet back to sender 18a. In this case, it is sender 18a that performs the analysis based upon the Send_time field (STOD) or stamp and the Recv_time field (RTOD) or stamp within probe 20.

The jitter measurement method will be understood to involve sending two successive ones of such timing probes and measuring jitter as the difference between the latencies of the two probes from sender 18a to responder 18b, as described in detail above. Each latency that figures into this jitter measure represents a difference between the Send-time field (STOD) and the Recv_time field (RTOD) for the respective timing probes 20.

Finally, the data packet loss method in accordance with the invention may be understood to involve the use, as described in detail above, of the Send_seq_no and the Recv_seq_no fields that are defined within probe data packet 20. Packet loss may be understood to be a measure of degree of correlation between the succession of probes 20 transmitted by SAA sender 18a and the succession of transmitted probes 20 actually received by SAA responder 18b. As described above, responder 18b places in the Recv_seq_no field a count that represents the sequence number of successive, received probe data packets Pa, Pb. Responder 18b then echoes the modified probe data packets Pa', Pb' (refer again to FIG. 1) back to sender 18a, which determines whether the fields are different by other than one (1). If so, there has been data packet loss. As described above, it may be further determined in accordance with the invention in some cases whether the packet was lost in transmission from sender to responder or in echo transmission from responder to sender.

Those of skill in the art will appreciate that the invention may be implemented in hardware, firmware or software, the last of these being the preferred embodiment for reasons of ease of transport, maintenance and upgrade. In other words, preferably in accordance with the invention, the buffers, subtractors and comparators shown in FIG. 3 are implemented in the form of reading various stored memory contents and calculating differences therebetween as in equations (1)-(6) set forth above. Those of skill also will appreciate that the organization, structure and ordering of the fields within probe 20 may be different. Those of skill also will appreciate that the logic/arithmetic functions performed by SAA sender 18a and SAA responder 18b may be modified. Those of skill will appreciate that the order in which certain functions are performed may vary. Such modifications are contemplated. Thus, any and all suitable means of realizing the invention are within the spirit and scope of the invention.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

The invention claimed is:

1. A computer readable medium storing a program for measuring network performance in an Internet protocol (IP) network, the program comprising:
    instructions for generating a data packet including a send sequence number representing a relative send timing indicator for the data packet;
    instructions for sending the data packet to a respondent network address;
    instructions for receiving a return data packet including a receive sequence number representing a relative receive timing indicator for the return data packet at the respondent network address; and
    instructions for comparing the send sequence number with the receive sequence number to measure data packet loss.

2. The program of claim 1 including instructions for extracting the receive sequence number from a data packet field in the return data packet.

3. The program of claim 1 including:
    instructions for sending and receiving two or more data packets having one each of the send sequence numbers and the receive sequence numbers; and
    instructions for determining data packet loss if the send sequence number does not equal the receive sequence number associated with one of the two or more data packets.

4. The program of claim 1 including:
    instructions for time stamping a send time of the data packet; and
    instructions for determining a transport latency.

5. The program of claim 4 including:
    instructions for time stamping a receive time of the return data packet; and
    instructions for determining a two-way transport latency.

6. The program of claim 5 including instructions for adjusting the transport latency by subtracting a data processing time of the send time or the receive time.

7. The program of claim 4 including:
    instructions for determining a second transport latency of a second data packet; and
    instructions for determining a network jitter by comparing the transport latency with the second transport latency.

8. A device for measuring network performance in an Internet protocol (IP) network comprising:
    a counter generating a send sequence number representing a relative send timing indicator for a data packet sent to a respondent network address, the counter generating a receive sequence number representing a relative receive timing indicator for a return data packet received by the device; and a comparator comparing the send sequence number with the receive sequence number to measure data packet loss.

9. The device of claim 8, the return data packet including a data packet field modified to include the receive sequence number.

10. The device of claim 8, the comparator evaluating sequence numbers for two or more data packets and determining data packet loss if the send sequence number does not equal the receive sequence number associated with one of the two or more data packets.

11. The device of claim 8, the comparator evaluating a send time or a receive time of the data packet and determining a transport latency.

12. The device of claim 11, the comparator adjusting the transport latency by subtracting a data processing time of the send time or the receive time.

13. The device of claim 8, the comparator evaluating a send time and a receive time of the data packet and determining a two-way transport latency.

14. The device of claim 8, the comparator determining a network jitter by measuring a variance between the transport latency of the data packet and a second transport latency of a second data packet.

15. A method of monitoring network performance in an Internet protocol (IP) network comprising:

generating a send time of day (TOD) stamp for a timing probe data packet;

inserting the send TOD stamp in the timing probe data packet;

sending the timing probe data packet over the network to a receiving host;

generating a receive TOD stamp for the timing probe data packet; and analyzing a data transport latency based upon the send TOD stamp and the receive TOD stamp.

16. The method of claim 15 including subtracting a processing time of the send TOD stamp or the receive TOD stamp when analyzing the data transport latency.

17. The method of claim 15 including determining an average data transport latency for transport of two or more timing probe data packets.

18. The method of claim 15 including determining a two-way transport latency.

19. The method of claim 15 including storing a data processing time in the timing probe data packet.

20. The method of claim 15 including determining a network jitter by comparing the data transport latency of two of more timing probe data packets.

* * * * *

UNITED STATES PATENT AND TRADEMARK OFFICE
CERTIFICATE OF CORRECTION

| | | |
|---|---|---|
| PATENT NO. | : 7,792,083 B2 | Page 1 of 1 |
| APPLICATION NO. | : 11/428734 | |
| DATED | : September 7, 2010 | |
| INVENTOR(S) | : Frank G. Bordonaro et al. | |

It is certified that error appears in the above-identified patent and that said Letters Patent is hereby corrected as shown below:

On column 16, line 24, CLAIM 20, after "two" delete "of" and insert -- or --.

Signed and Sealed this
Tenth Day of April, 2012

David J. Kappos
*Director of the United States Patent and Trademark Office*